(12) United States Patent
Podiebrad et al.

(10) Patent No.: US 10,286,511 B2
(45) Date of Patent: May 14, 2019

(54) WORKPIECE POSITIONING DEVICE FOR A PROCESSING CENTER, PROCESSING CENTER, AND METHOD

(71) Applicant: F. ZIMMERMANN GMBH, Neuhausen (DE)

(72) Inventors: Christian Podiebrad, Weingarten (DE); Daniel Demlang, Engstingen (DE)

(73) Assignee: F. ZIMMERMANN GMBH, Neuhausen (DE)

( * ) Notice: Subject to any disclaimer, the term of this patent is extended or adjusted under 35 U.S.C. 154(b) by 108 days.

(21) Appl. No.: 15/479,351

(22) Filed: Apr. 5, 2017

(65) Prior Publication Data
US 2017/0297157 A1 Oct. 19, 2017

(30) Foreign Application Priority Data
Apr. 14, 2016 (DE) .......................... 10 2016 106 935

(51) Int. Cl.
*B23Q 7/14* (2006.01)
*B23Q 7/16* (2006.01)
*B23C 1/02* (2006.01)
*B23Q 7/00* (2006.01)
*B23Q 7/18* (2006.01)

(52) U.S. Cl.
CPC ................ *B23Q 7/165* (2013.01); *B23C 1/02* (2013.01); *B23Q 7/003* (2013.01); *B23Q 7/1431* (2013.01);
(Continued)

(58) Field of Classification Search
CPC ....... Y10T 29/5124; Y10T 409/304536; Y10T 409/30532; Y10T 409/305824;
(Continued)

(56) References Cited

U.S. PATENT DOCUMENTS 3,700,228 A * 10/1972 Peale ................... B23Q 1/5437
269/57
4,475,642 A 10/1984 Fritz
(Continued)

FOREIGN PATENT DOCUMENTS

EP 0 062 267 A2 10/1982
EP 0 901 880 A2 3/1999

*Primary Examiner* — Daniel W Howell
*Assistant Examiner* — Yasir A Diab
(74) *Attorney, Agent, or Firm* — Ronald S. Lombard

(57) ABSTRACT

A workpiece positioning device for a processing center, and a processing center and a method for positioning a workpiece mounted on a workpiece palette in a processing center is disclosed. The workpiece positioning device comprises a deposit place comprising a horizontal deposit surface for a workpiece palette with a workpiece mounted thereon and a pivot bearing that receives the workpiece palette on a first edge of said workpiece palette in a rotatable manner. Furthermore, the workpiece positioning device comprises a pivoting device for transferring the workpiece palette from a horizontal position into a vertical position, and vice versa. The pivoting device comprises a horizontal and a vertical linear axle and a gripping device and is disposed to grip a workpiece palette on another, second edge and to pivot, by simultaneously moving the horizontal and the vertical linear axles, the workpiece palette around the pivot bearing on a circular path.

18 Claims, 9 Drawing Sheets

(52) U.S. Cl.
CPC .............. *B23Q 7/18* (2013.01); *Y10T 29/5124* (2015.01); *Y10T 409/30532* (2015.01); *Y10T 409/304536* (2015.01); *Y10T 409/305824* (2015.01)

(58) Field of Classification Search
CPC .. Y10T 409/309968; Y10T 409/30868; B23Q 7/16; B23Q 7/165; B23Q 7/18; B23Q 7/1426; B23Q 7/1431
USPC ........ 198/346.1, 346.2, 346.3, 468.6; 414/16
See application file for complete search history.

(56) References Cited

U.S. PATENT DOCUMENTS

| | | | | |
|---|---|---|---|---|
| 4,664,570 A | * | 5/1987 | Tsukiji | G05B 19/41 409/132 |
| 5,172,464 A | * | 12/1992 | Kitamura | B23Q 1/5406 198/346.1 |
| 2003/0182782 A1 | * | 10/2003 | Hessbruggen | B23Q 1/012 29/27 C |
| 2003/0221308 A1 | * | 12/2003 | Hessbruggen | B23Q 1/012 29/563 |
| 2004/0049902 A1 | * | 3/2004 | Hagstrom | B23B 29/04 29/26 A |
| 2005/0139036 A1 | * | 6/2005 | Kato | B23Q 1/287 74/813 L |
| 2005/0254914 A1 | * | 11/2005 | Kato | B23Q 1/0009 409/221 |
| 2009/0252587 A1 | * | 10/2009 | Mischler | B23Q 7/1426 414/704 |
| 2010/0260569 A1 | * | 10/2010 | Ham | B23Q 1/5406 409/80 |
| 2010/0320668 A1 | * | 12/2010 | Takahashi | B23Q 1/66 269/55 |
| 2011/0233879 A1 | * | 9/2011 | Tullmann | B23Q 1/44 279/110 |

* cited by examiner

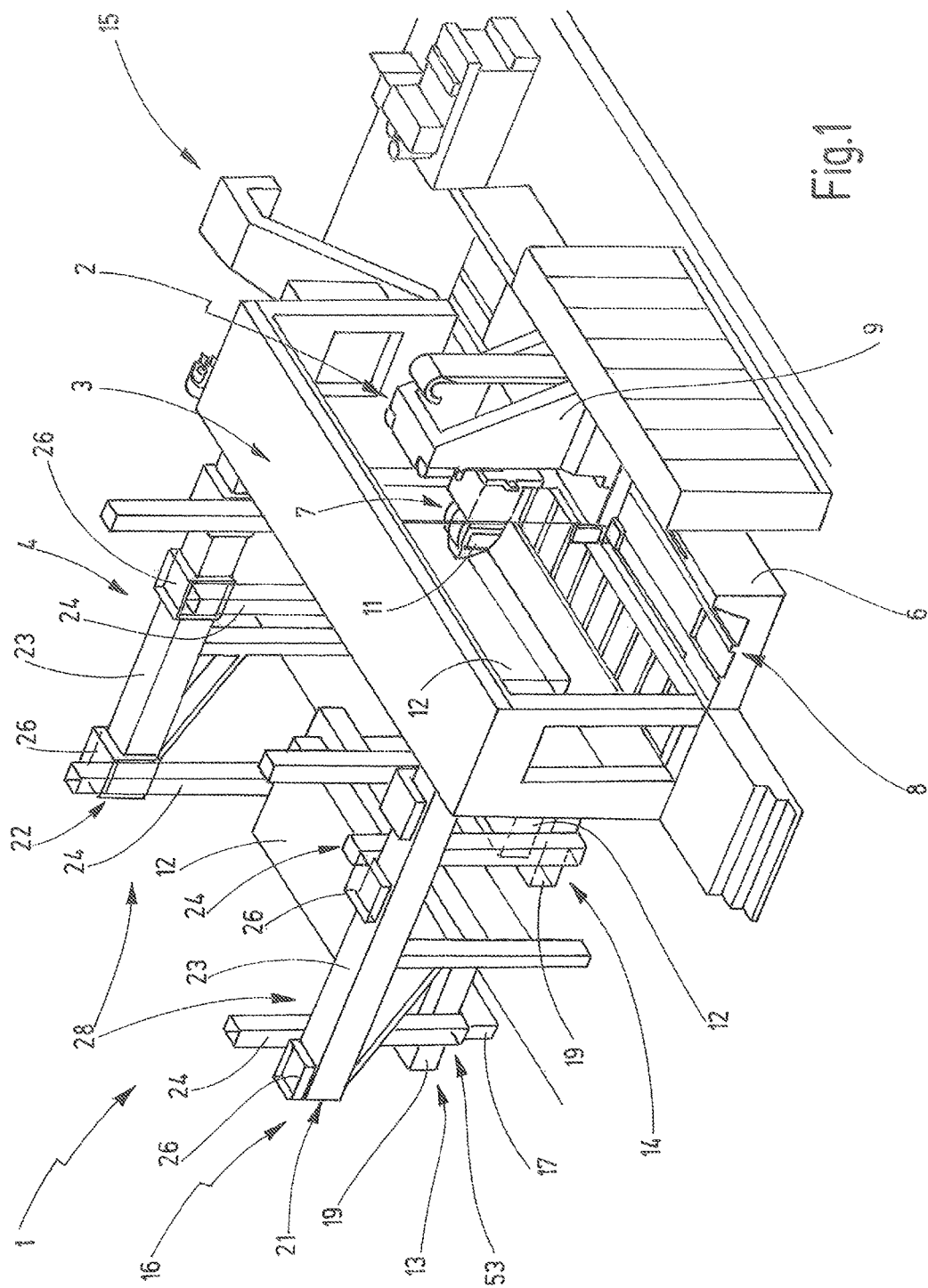

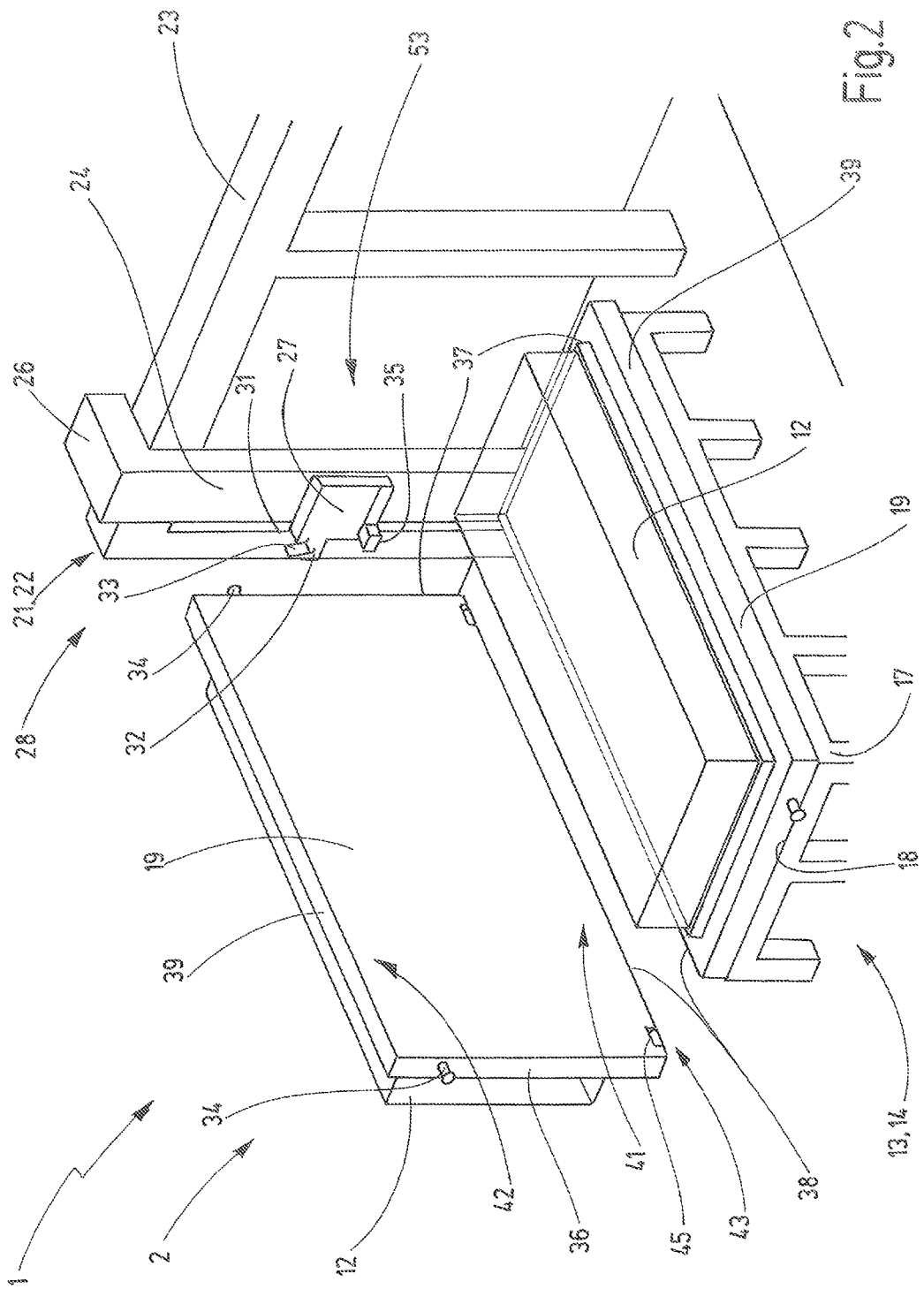

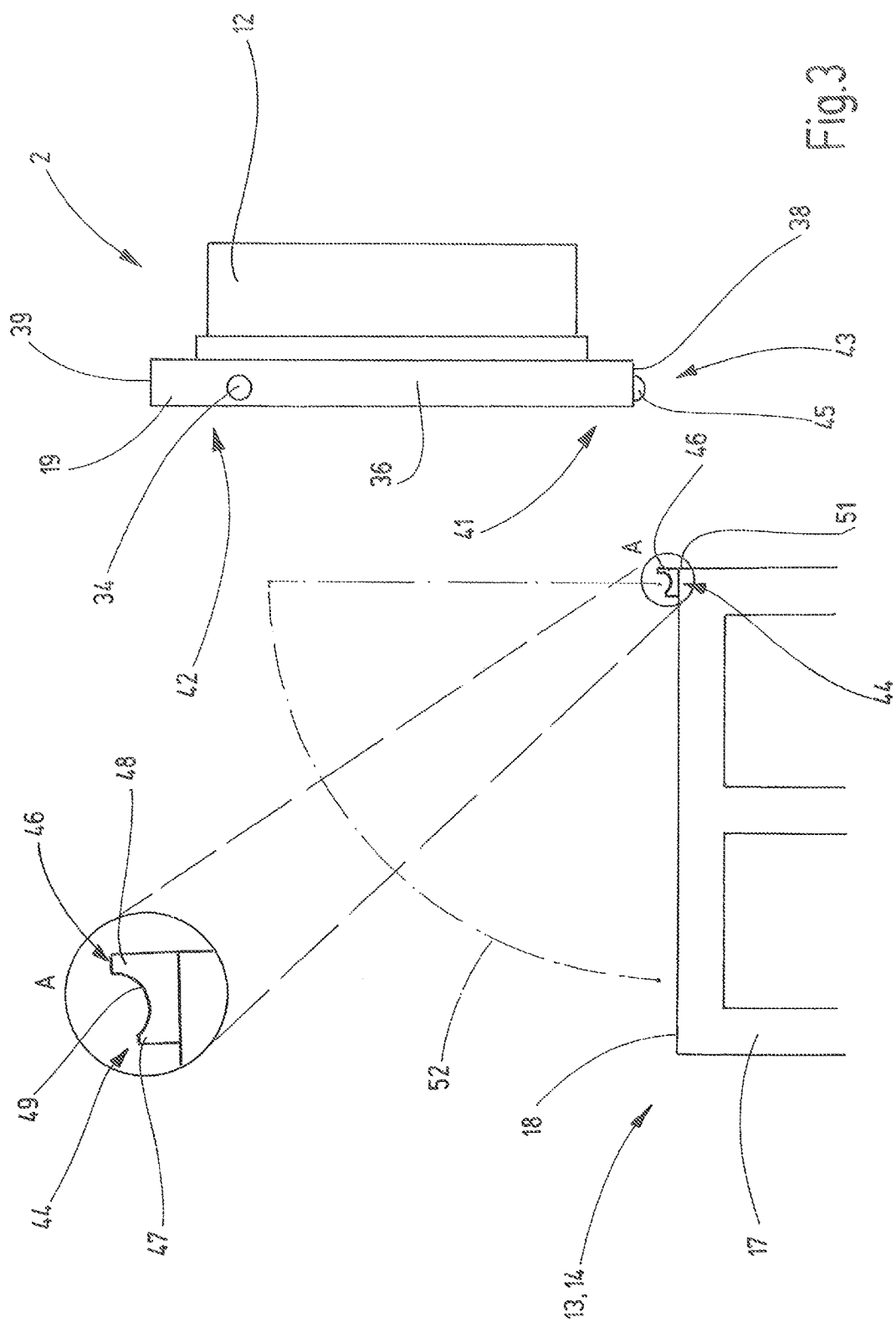

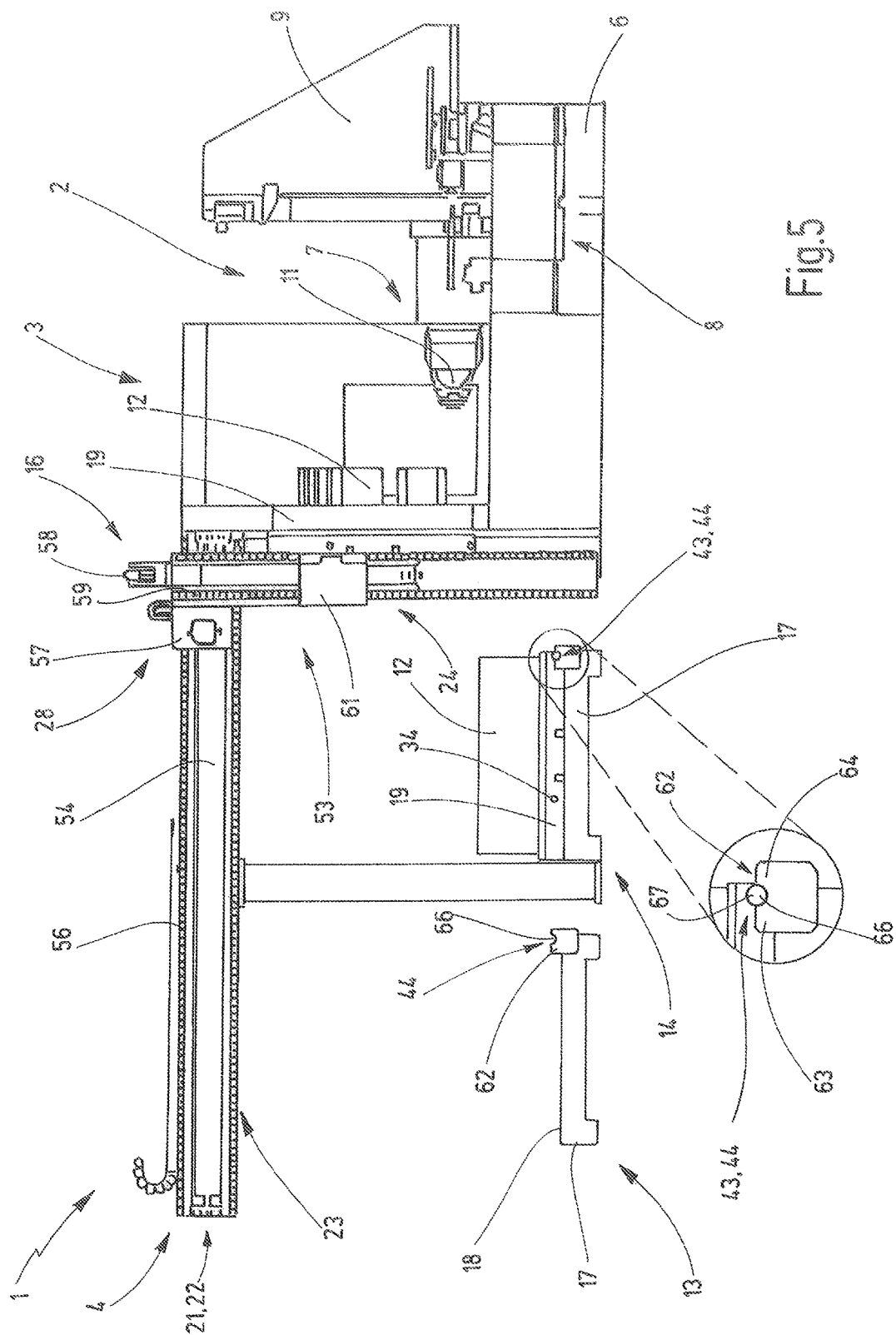

WORKPIECE POSITIONING DEVICE FOR A PROCESSING CENTER, PROCESSING CENTER, AND METHOD

CROSS-REFERENCE TO RELATED APPLICATION

This application claims the priority benefits of German Application No. 10 2016 106 935.3 filed Apr. 14, 2016. The said German Application No. 10 2016 106 935.3 is incorporated herein by reference as though fully set forth.

BACKGROUND OF THE INVENTION

The present invention relates to a workpiece positioning device for a processing center, in particular a horizontal processing center, a processing center comprising such a workpiece positioning device, and a method for positioning a workpiece in a processing center.

In particular in the processing of large parts such as, for example, in tool making, mold making and model making, or in the production in the automobile industry, aerospace industry and in comparable applications in which complex surfaces of large workpieces are to be produced with high surface quality and at high processing speeds, it is common to mount and arrange the workpiece raw parts on a palette and to subsequently move the workpiece palette with the workpiece to the processing unit of a machine tool or to a processing station of a processing center for processing. After processing, the workpiece palette with the processed workpiece is again removed from the processing unit or processing station and transported to a storage area intended for this purpose. To do so, different transport systems, in particular motor-driven linear axles, are used to transport the workpiece palettes between a setup station, a place of processing and potential storage areas and to position them there.

In particular in horizontal processing machines or in horizontal processing centers comprising a horizontally held processing spindle that can be spatially moved and fixed in any pivoting position, e.g., a milling spindle, the palette with the workpiece must be transferred out of a horizontal position on a deposit place of a setup station or a buffer station into a vertical position that corresponds to the processing position or is shifted into said position. To do so, a palette pivoting or swiveling device is necessary that accomplishes the swiveling or pivoting of the palette from the horizontal position into the vertical position and vice versa. For this purpose, it is conventional to use, e.g., palette rotating devices comprising two rotatable gripping arms, or those based on the use of pneumatic or hydraulic cylinders. In the case of very large and heavy workpieces that require an appropriately robust workpiece palette as carrier, the weight of the palette with the workpiece may be several tons, for example, up to 10 tons or even more. The spatial dimension of the palette with the workpiece may also be enormous. Any appropriate palette rotating or palette pivoting device must thus be designed so as to be extremely large and robust and be able to produce extremely great torques. Considering the weight of the workpiece palette mentioned hereinabove, torques within the range of 30,000 to 40,000 Nm may be required on each side of the palette.

Such a palette rotating or palette pivoting device may be extremely difficult to implement and be very expensive. Furthermore, the workpiece palette must frequently be moved into and out of the processing station with an additional linear movement, and, optionally, be raised or lowered for suitable processing or storage positions, so that, in addition to the rotating or pivoting device, motor-driven linear axles are required. Considering the processing of large parts, this results in hybrid transport and positioning devices that are highly complex, bulky and require a large footprint, as well as difficult to handle, such devices involving high costs for acquisition and maintenance.

Considering this, it is the object of the invention to overcome the disadvantages of prior art and provide a new workpiece positioning device for a processing center that is suitable, in particular, for processing large parts, said device including horizontal processing centers. In particular, it is the object of the present invention to provide a workpiece positioning device, a processing center and a method for positioning a workpiece in a processing center that allow a positioning of workpieces, in particular large workpieces, while said workpieces can be pivoted with simple means.

This object is achieved with the workpiece positioning device for a processing center exhibiting the features of claim 1, a processing center according to claim 15, and a method for positioning a workpiece mounted on a workpiece palette in a processing center according to claim 18. Particularly advantageous embodiments of the invention are the subject manner of the dependent claims.

SUMMARY OF THE INVENTION

The workpiece positioning device comprises a deposit place that comprises a horizontal deposit surface for a workpiece palette and a pivot bearing that is disposed to pick up—in a rotatable manner—the workpiece palette on a first edge of said palette, and a pivoting device for transferring a workpiece palette out of a horizontal position into a vertical position and vice versa. The pivoting device is disposed to grip a tool palette on another, second, edge, and to pivot—by a simultaneous relative movement of a horizontal and a vertical linear axles—the second edge of the workpiece palette on a circular path around the pivot bearing.

The workpiece positioning device thus provides a pivot bearing on a deposit place in which the workpiece palette can be pivotally deposited or stored, and a pivoting device that uses a horizontal and a vertical linear axle for pivoting the work piece palette. The horizontal and the vertical linear axles are activated or moved in a coordinated manner such that the palette can be pivoted on an a circular arc or circular segment, in particular a quarter circle, by 90° around the pivot bearing in one sense of rotation in order to vertically raise the workpiece palette, or in an opposite sense of rotation in order to lower the workpiece palette into the horizontal position. The pivot bearing supports the palette on its first edge, and supports and guides said palette during its pivoting movement. Advantageously, only the driven linear axles are used for pivoting, these being—in most cases—already provided for loading and removing workpiece palettes or for their transport between setup, buffer and processing stations. Furthermore, such linear axles can be made in an extremely robust and sufficiently strong manner in order to move even large parts in vertical and horizontal directions, or in the manner according to the invention.

The pivoting device can thus comprise at least one horizontal linear axle with a horizontal slide driven by a motor, which slide can be moved, for loading and removing the workpiece palette, back and forth between said processing station of the processing center, and comprise a vertical linear axle with a vertical slide driven by a motor, said slide being able to raise and lower a workpiece palette in vertical direction. The slides may be directly driven or be driven by a motor via a gear, e.g., a chain gear or the like. The linear axles may be a part of a transport system that may also comprise an additional second horizontal linear axle that is perpendicular to the first horizontal linear axle in order to be able to move the workpiece palette in all three spatial directions and to be able to move them between any stations.

The movement of the linear axles may be controlled by a control of the processing machine. In particular, the control can activate the horizontal and the vertical axles in such a manner that the path of movement of one of the linear axles follows the time behavior of a cosine function, whereas the path of movement of the other linear axle follows the time behavior of a sine function. This results in the desired movement on a circular path.

In a particularly preferred embodiment, the movement of the linear axles is controlled by a CNC control of the processing center. A control program for pivoting on a circular path is generally integrated as a functionality of the CNC control for the appropriate movement of a tool at the time of processing. This functionality may be adapted with minimal expense and be utilized for the purpose of pivoting the workpiece palette. The programming and overall implementation effort to make possible this solution is relatively minimal.

The pivot bearing of the deposit place is preferably configured so a to be suitable for the workpiece palette to be deposited therein relatively rapidly and simply and be rotatably supported. In an advantageous embodiment the pivot bearing has a claw that is arranged on the horizontal deposit surface or on one side of the deposit place and is open upward in the position of use in order to define a preferably circular or V-shaped pivot bearing surface. The pivot bearing surface is disposed for the rotatable accommodation of an appropriate pivot bearing element that is provided on the workpiece palette.

In one embodiment, the claw of the pivot bearing has a first and a second claw finger, these fingers projecting from the horizontal deposit surface of the deposit place and defining, among each other, the circular pivot bearing surface. In doing so, the claw finger located closer to one edge of the deposit place preferably projects farther from the horizontal deposit surface than the claw finger that is farther from the edge. Such a configuration results in a stop for the palette if it is positioned and deposited on the deposit place and provides a full-surface, peripherally far-reaching pivot bearing or pivot guide for pivoting, while the short claw finger of the workpiece palette allows a rotation of the workpiece palette in the pivot bearing up to the horizontal position and does not impair said rotation.

An appropriately configured pivot bearing surface could also be recessed in the horizontal deposit surface or, as already mentioned, there could be claws or pivot bearing elements molded or mounted on opposite sides of the deposit place. Different configurations of the pivot bearing are possible.

To achieve an alternating effect with the pivot bearing, the workpiece positioning device furthermore comprises at least one bearing element provided on a workpiece palette, said bearing element being disposed to be rotatably accommodated in the pivot bearing with minimal play. A bearing element matching the pivot bearing can be integrally made in one piece with the workpiece palette or be mounted thereto.

In an advantageous embodiment, the bearing element is a partially cylindrical region that is provided on a side of the workpiece palette adjoining the first edge. In another embodiment, the bearing element is made of a cylindrical bearing pin projecting from a lateral surface of a workpiece palette. The outside diameter of the partially cylindrical region of the bearing pin is selected so as to match the inside dimensions of the pivot bearing surface of the pivot bearing, e.g., it has an inside diameter of a rounded pivot bearing surface of the pivot bearing. As an integral part of the workpiece palette the bearing element may be configured in a highly robust manner and displaying minimal wear in order to also bear a very high weight of the palette with the tool mounted thereto. Also possible are other configurations of the bearing element such as, for example, spherical regions on the workpiece palette, bearing bolds or the like.

Depending on the use and the dimensions of the workpiece palette, a single, elongated pivot bearing surface on the deposit place and a single matching bearing element on the workpiece palette are sufficient for the pivot bearing. Generally, however, two or more such pairs comprising a bearing element and a pivot bearing are provided for support and bearing, in which case the bearing elements are arranged at a distance from each other on the first edge of the workpiece palette while the corresponding number of pivot bearings are provided at a distance from each other on an edge of the deposit place associated with the first edge of the workpiece palette. In a preferred embodiment, respectively one pair of a bearing element and a pivot bearing location are provided on one corner of a longitudinal side of the palette and the deposit place.

In preferred embodiments, the workpiece palette bears at least one gripping element, and the pivoting device comprises a gripping device that is disposed to grip the gripping element in such a manner that a relative rotation between the gripping element and the gripping device is possible.

The at least one gripping element can be simply a gripping bolt provided on the workpiece palette and being integrally configured or mounted thereto, said gripping bolt projecting in the vicinity of the second edge of the workpiece palette on one side of the workpiece palette. The gripping bolt may, in particular, also be provided with a substantially cylindrical outside surface that is suitable for gripping by the gripping device with relative rotatability.

It is also possible to provide other handle elements such as, e.g., loops, gripping bars or the like, for gripping by means of the gripping device.

The gripping device may comprise a gripping arm for gripping the gripping element of the workpiece palette. In a preferred embodiment, the gripping arm is mounted on a slide of a horizontal and the vertical linear axels, preferably the vertical axle. Preferably, the gripping arm has at least one gripping surface that is rounded in at least some sections, said gripping surface picking up the gripping element of the workpiece palette in a rotatable manner and with minimal play. For example, the rounded or circular gripping surface of the gripping arm may have an outside radius that substantially corresponds to the outside radius of the cylindrical gripping bolt.

In a particularly preferred embodiment, the gripping device further comprises a stop block that is preferably configured so as to form one piece with the slide that bears the gripping arm and is arranged to come into abutment with the palette when the workpiece palette is pivoted in vertical direction. Consequently, when the workpiece palette is being pivoted into the vertical position, the stop block prevents a further pivoting or swaying of the palette during transport and holds the palette in the precise vertical position—optionally also in the course of processing. Then the workpiece can be supported well against the processing forces of the processing spindle—even during the processing operation.

In accordance with another aspect of the invention, a processing center for processing workpieces that are mounted on a palette is provided. The processing center comprises a processing station comprising a processing spindle, in particular a milling spindle, that is movably supported and guided on a machine bed or machine frame, a setup station for mounting workpieces on a workpiece palette, and/or a buffer station for the temporary intermediate depositing of a workpiece palette with a workpiece mounted thereto, and a workpiece positioning device that is provided and configured as described hereinabove. In particular, the workpiece positioning device is arranged to move the workpiece palette with the mounted workpiece during a transport between one of the setup station, the buffer station and the processing station and another one of the stations, from a horizontal position into a vertical position or vice versa. The deposit place of the workpiece positioning device is thus, for example, part of the setup station and/or the buffer station and comprises a pivot bearing, while the horizontal and the vertical linear axles ensure a transport of the workpiece palette into the processing center, including loading the workpiece palette in the processing station and removing it therefrom, as well as a pivoting of the workpiece palette.

In a particularly preferred embodiment the processing center is a horizontal processing center, wherein the processing spindle is held in a substantially horizontal position on the machine frame, and the workpieces on the workpiece palette are loaded in horizontal position and processed in vertical position.

Considering the embodiments, it is also possible for the processing center, in particular the horizontal processing center, to comprise a setup station with a deposit place, as well as a buffer station with a deposit place, wherein the workpiece positioning device may be disposed to deposit workpiece palettes in horizontal position on the deposit places of the setup station and the buffer station and to transport them in vertical position between the setup station, the buffer station and the processing station. This may allow a transport of the workpieces with a few, simply constructed components in a robust, uncomplicated and space-saving manner.

Other than that, the processing center may use any embodiment of the workpiece positioning device described hereinabove and likewise benefit from the thusly achieved advantages.

In accordance with yet another aspect of the invention a method is provided for positioning a workpiece mounted on a workpiece palette in a processing center. The method comprises the following steps: providing of one horizontal and one vertical linear axle for transporting a workpiece palette in vertical and horizontal directions; depositing the workpiece palette in horizontal position on a deposit place so that a first edge of the workpiece palette is rotatably picked up in a pivot bearing; gripping of the workpiece palette on another, second edge in a relatively rotatable manner; and simultaneous moving of the horizontal and vertical linear axles in order to pivot the workpiece palette on a circular path around the pivot bearing, while the workpiece palette is rotatably supported in the pivot bearing in order to transfer the workpiece palette from a horizontal position into a vertical position and vice versa. The advantages of the inventive workpiece positioning device and the inventive processing center also benefit the inventive method, and the embodiments thereof as explained hereinabove may also be used together with their advantages applied analogously to the method. The method need not be performed in the stated sequence of method steps and may comprise additional method steps.

BRIEF DESCRIPTION OF THE DRAWINGS

Additional advantageous details of embodiments of the invention can be inferred from the dependent claims, the drawings, as well as the related description. Hereinafter, the invention is described in greater detail with reference to drawings that show exemplary embodiments of the invention that are by no means intended as being restrictive, wherein the same reference signs are used to identify the same elements in all Figures. The drawings show in:

FIG. 1 a perspective view of a horizontal processing center for the manufacture of large parts, in a greatly simplified illustration;

FIG. 2 a detail of the horizontal processing center according to FIG. 1, illustrating components of a workpiece positioning device according to one embodiment of the invention, in a highly schematic diagrammatic perspective representation;

FIG. 3 a side view of a deposit place and a workpiece palette for use in the workpiece positioning device according to FIG. 2, in a highly schematic diagrammatic representation;

FIG. 5 a side view of a horizontal processing center for processing large parts, comprising a workpiece positioning device according to a further embodiment of the invention, in a simplified representation;

DETAILED DESCRIPTION OF THE INVENTION

Figure 4A:
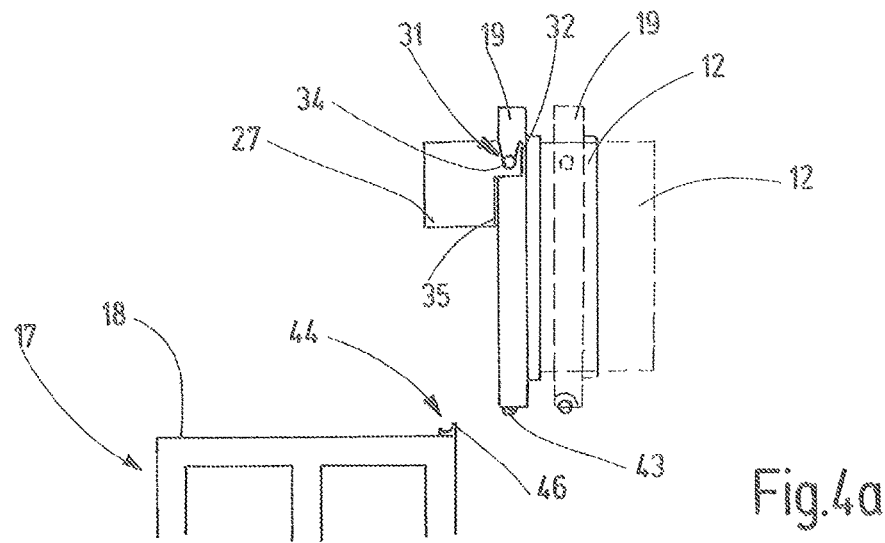
FIGS. 4a to 4f diagrams that illustrate the process of positioning a workpiece palette with a mounted workpiece between the deposit place and a processing position as illustrated in FIG. 3.

FIG. 1 shows a greatly simplified perspective representation of a horizontal processing center 1 that is suitable for processing parts, in particular large parts such as they are manufactured or processed, for example, in tool making, mold making and model making or for automobiles and aircraft. In principle, the invention may be applied in any processing center 1 or any processing machine, in which it is required or desired to transfer a workpiece that is mounted on a palette or any other workpiece carrier, before, during or after processing, between a first position and another, second position and, in particular, to transfer said workpiece between a horizontal position and a vertical position.

As can be seen from FIG. 1, the processing center 1 comprises a processing station 2, a work space 3 and a handling system 4. The processing station 2 comprises a processing unit 7 that is movably supported by a machine bed 6, which processing unit may, in particular, be a milling unit. The processing unit 7 is movably supported and guided in horizontal direction along longitudinal guides 8 as indicated in FIG. 1. The processing unit 7 comprises a machine frame or a column 9 that is movably supported and guided in linear direction in another horizontal direction perpendicular to the first horizontal direction toward and away from the work space 3. The column 9 supports a processing spindle 11, e.g., a milling spindle, that is supported on the column 9 so as to be movable in vertical direction and held in horizontal position. Consequently, the processing spindle 11 projects in its longitudinal extension in the direction toward the work space 3 and bears, on its free end, a processing tool that is not specifically shown here, e.g., a milling tool, for processing a workpiece 12. The processing spindle 11 may comprise additional, rotating, pivoting and/or processing axles, as is known per se.

As can be seen from FIG. 1, the workpiece 12 is held in vertical position in the work space 3 in order to be processed by the processing spindle 11. Due to the vertical processing position, chips may advantageously fall to the floor of the work space 3 while the workpiece 12 is being processed and be easily transported away by a chip conveyor 15 indicated here.

The handling system 4 is provided for delivering the workpiece 12, for loading the workpiece 12 into the work space 3 and for removing said workpiece from the work space 3. In the exemplary embodiment of the processing center 1 depicted in FIG. 1, this comprises a setup station 13, a buffer station 14 and a linear axle system 16.

The setup station 13 comprises a deposit place 17 that may be a deposit table or a specifically equipped deposit area of the foundation. The deposit place 17 comprises a planar and substantially horizontally oriented deposit surface 18 on which a workpiece palette 19 may be positioned, said workpiece palette receiving the workpiece 12 for processing. The use of a workpiece palette 19 as the carrier for the workpiece 12 for transporting and processing in the processing center 1 is of advantage in particular with large parts with large dimensions and high weight.

In this case, the workpiece palette 19 is a body having substantially the shape of a parallelepiped, however, is not restricted to a specific shape—in principle. Here, the workpiece palette 19 has a not specifically identified flat underside that can be placed in a planar manner on the deposit surface 18. On the upper side of the workpiece palette 19, the workpiece 12 is positioned in the setup station 13 and appropriately prepared and fixed for processing. In FIG. 1, the workpiece 12 is also represented by a body that has substantially the form of a parallelepiped, however, it may be any cubic, rotation-symmetrical or otherwise configured workpiece.

Next to the setup station 13, there is further—but not necessarily—provided the buffer station 14 that is disposed for an intermediate storage of the workpiece 12 set up in the setup station 13 and mounted on the workpiece palette 19, before said workpiece is loaded in the work space and processed therein, as well as thereafter. The buffer station 14 or several such buffer stations 14 make it possible to feed workpieces 12 to the work space 3, to process them in said work space and to remove them therefrom, while other workpieces are set up at the same time in the setup station 13, which can contribute to a reduction of the total processing times. In the same manner as the setup station 13, the buffer station 14 may be configured with a deposit place in the form of a here not specifically shown deposit table or a deposit area specifically set up on the foundation.

The linear axle system 16 is provided for loading the workpiece 12 mounted on the workpiece palette 19 in the work space 3 and for removing same therefrom. This linear axle system 16 comprises a first and a second linear axle arrangement 21, 22 that are arranged parallel to each other on both sides of the setup station 13 and the buffer station 14—viewed in longitudinal direction of the processing center 1. The first linear axle arrangement 21 and the second linear axle arrangement 22 are substantially configured so as to be identical, and each comprises at least one horizontal linear axle 23 and at least one vertical linear axle 24. Each linear axle 23, 24 represents a module that comprises a slide driven by a not specifically illustrated motor or any other driven element that can be moved along the respective horizontal or vertical axle. For example, FIG. 1 shows an exemplary slide 26 of the horizontal linear axle 23. FIG. 2 schematically shows a corresponding slide 27 of the vertical linear axle 24.

The two linear axle arrangements 21, 22 are disposed to grip a workpiece palette 19 from both sides and transport it in vertical, as well as in horizontal, direction. As will be described hereinafter in greater detail, the linear axle arrangements 21, 22 further allow a pivoting of the workpiece palette 19 in order to transfer it from a horizontal position on the deposit place 17 to the setup station 13 or the buffer station 14 into a vertical position for processing in the work space 3, and vice versa.

As shown by FIG. 1, several vertical linear axles 24 may be arranged on the horizontal linear axle 23 in order to make the transport of workpiece palettes 19 from the setup station 13 to the buffer station 14, as well as from the buffer station 14 to the work space 3, parallel. Generally, however, a single driven horizontal linear axle 23 and a single driven vertical linear axle 24 are sufficient per linear axle arrangement 21, 22 in order to provide a workpiece positioning device 28 that makes it possible to appropriately transport workpiece palettes 19 in the processing center 1, to feed them to the work space 3 and to remove them therefrom.

FIG. 2 shows the workpiece positioning device 28 in greater detail in a highly schematic manner. The workpiece positioning device 28 comprises a deposit, for example the deposit place 17 of the setup station 13 or the buffer station 14 as shown in FIG. 1. For reasons of simplicity and to avoid confusion, FIG. 2 only shows one deposit 17 that may represent the setup station 13 or the buffer station 14. Furthermore, the workpiece positioning device 28 comprises the first and the second linear axle arrangements 21, 22, wherein only one of them, the linear axle arrangement 21, is shown in FIG. 2 for clarity. As can be seen, the horizontal linear axle 23 carries the slide 26 that can be moved in horizontal direction, and that bears the vertical linear axle 24 on which is arranged the vertical slide 27 that is moved in vertical direction driven by a motor that is not specifically illustrated here.

The vertical slide 27 carries a gripping device 31 that is arranged to grip a workpiece palette 19 in order to move it. It should be noted that—in principle—a reverse arrangement would also be possible, in which case one or more vertical linear axles 24 bear a horizontal linear axle 23 having a slide that can be moved in horizontal direction, and a gripping device like the gripping device 31 for gripping a workpiece palette 19.

As can be seen from FIG. 2, the gripping device 31 is substantially represented by a hook-shaped gripping arm 32 that is provided on the vertical slide 27—preferably integrally in one piece or mounted thereto. The gripping arm 32 projects on the side of the slide 27 facing the work space 3. On its upper side in FIG. 2, the gripping arm has an gripping surface 33 which is rounded on a portion thereof, and which can, in particular, also be inferred from FIG. 3 and is arranged to rotatably receive of a gripping element 34 with minimal play, said gripping element being provided on the workpiece palette 19.

The gripping element 34 is a substantially cylindrical gripping bolt that is provided on the palette—preferably integrally cast to it in one piece, or formed in another manner or mounted thereto. As can be seen from FIG. 2, a corresponding gripping bolt 34 or another gripping element 34 is arranged in a projecting manner on each narrow side 36, 37 of the workpiece palette 19 that—during operation—faces the respective linear axle arrangement 21 or 22. The cylindrical outer surface of the gripping bolt 34 is shaped in a matching manner in order to be accommodated in the gripping surface 33 of the gripping arm 32 in a manner that is secure but still allows a relative rotation.

Furthermore, referring to FIGS. 2 and 3, the gripping device 31 comprises a stop block 35 that is molded integrally to the gripping arm 32 supporting the vertical slide 27. The stop block 35 is disposed to come into abutment with the workpiece palette 19 in its vertical position and to support said workpiece palette.

As is further obvious from FIGS. 2 and 3, the workpiece palette 19 has a first and a second longitudinal side 38, 39 that form additional narrow sides of the workpiece palette 19 that extend perpendicularly to the narrow sides 36, 37 and connect said narrow sides. The first longitudinal side 38 defines a first edge 41 of the workpiece palette 19 while the second longitudinal side 39 defines a second edge 42 of the workpiece palette. The edge 41 or 42 is understood to mean the region of the workpiece palette 19 adjacent to the longitudinal side 38 or 39, said region also comprising points that are at a distance from the longitudinal side 38 or 39 and that may also be on the narrow sides 36, 37. The gripping bolts 34 are arranged, for example, on the second edge 42 in the vicinity of the second longitudinal side 39 of the workpiece palette 19.

On the first edge 41—here, in particular—directly adjacent to the first longitudinal side 38 of the workpiece palette 19—the bearing elements 43 of the workpiece palette 19 are provided, said bearing elements being disposed to be accommodated, with minimal play, in an associate pivot bearing 44 in the deposit place 17 (cf. FIG. 3). Here, the bearing elements 43 are formed by partially cylindrical regions that are molded in one piece to the first longitudinal side 38 of the workpiece palette 19. Here, in particular two such bearing elements 43 are arranged at a distance from each other in the immediate vicinity of the respective narrow side 36 or 37 (cf. FIG. 2). Consequently, the workpiece palette 19 is substantially rotatably supported on opposite ends or corners of its first edge 41.

Referring to FIG. 3, the pivot bearing 44 matching the bearing elements 43 is shown in greater detail. In the illustrated embodiment, the pivot bearing 44 is represented by a claw 46 that, here, is provided on the horizontal deposit surface 18 of the deposit place 17—preferably integrally cast thereto in one piece, or mounted thereto. In a lateral view, the claw 46 is substantially C-shaped, this being accomplished by a first claw finger 47 and a second claw finger 48 that substantially project vertically upward from the deposit surface 18 and define a substantially circular pivot bearing surface 49 between them. The circular pivot bearing surface 49 has an inside diameter that substantially corresponds to the outside diameter of the partially cylindrical region 45 of the bearing element 43 that fits rotatably with minimal play in the associate pivot bearing 44. Although this is not obvious from the Figures, two such claws 46 are arranged at a distance from each other on a longitudinal edge 51 of the deposit place 17 in the vicinity of the respective corners of the deposit place 17, corresponding to the position of the bearing elements 43 on the workpiece palette 19.

As is further obvious from FIG. 3 the second claw finger 48 located closer to the longitudinal edge 51 of the deposit place 17 is configured higher so that it projects farther from the horizontal deposit surface 18 of the deposit place 17 than the first claw finger 47 that is more remote from the longitudinal edge 51. This configuration provides an abutment and a guide for inserting the bearing element 43 in the pivot bearing 44 and results in a full-surface pivot support and pivot guide, while the workpiece palette 19 is pivoted in and around the pivot bearing 44. Furthermore, the shorter, first claw finger 47 allows a simple rotation of the workpiece palette 19 up to its horizontal position in which it lies flat on the deposit surface 18, without impairing the rotation.

Figure 4B:
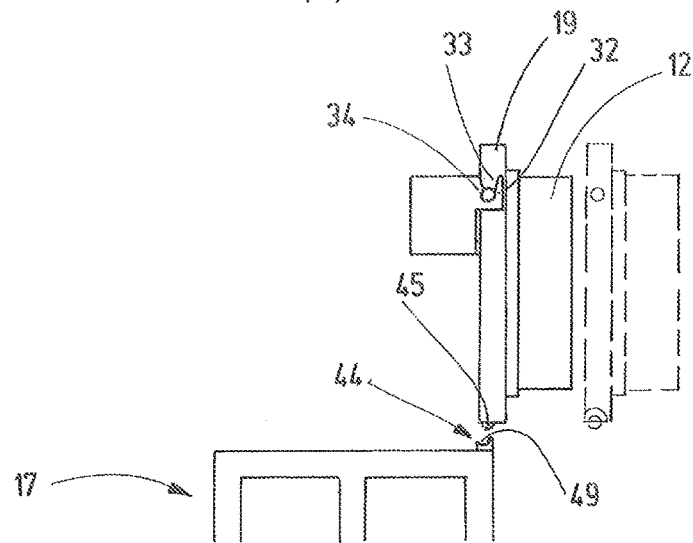
Figure 4C:
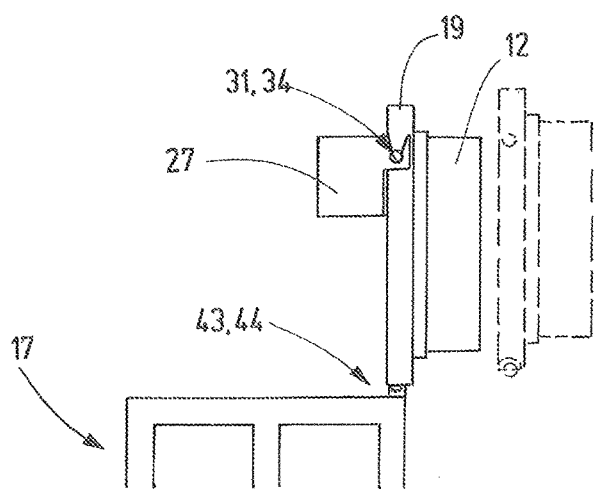
Figure 4D:
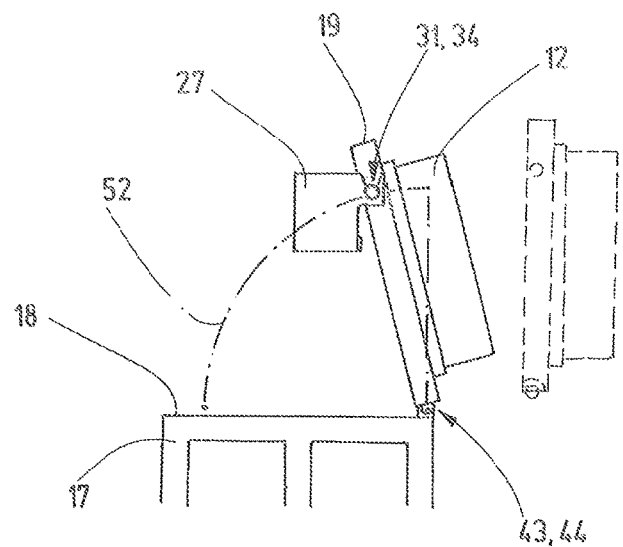
Figure 4E:
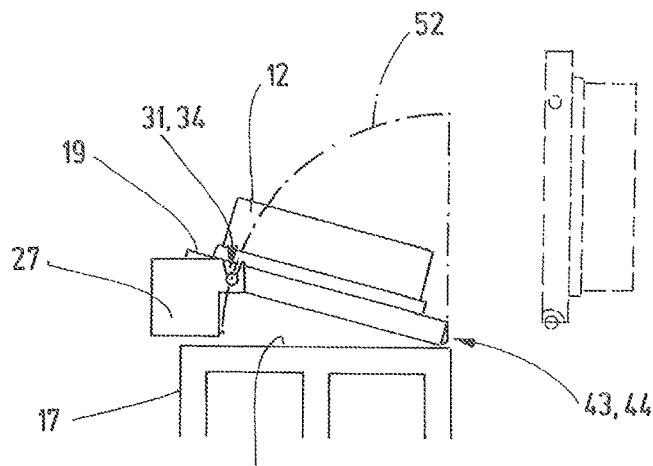
Figure 4F:
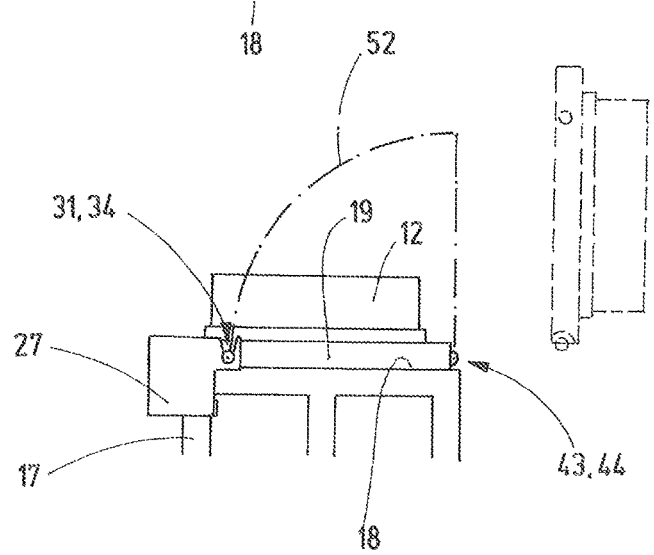

In order to explain the function of the workpiece positioning device 28, reference is now made to FIG. 3 and FIGS. 4a to 4f that show—in chronological order—the process of positioning a workpiece palette 19 with a workpiece 12 mounted thereto. The starting point is the vertical processing position as shown by FIG. 3. The workpiece palette 19 is then to be transferred into the horizontal position as shown by FIG. 4f, in which position said palette is deposited on the deposit surface 18 of the deposit place 17.

In this case, the movement and the function of the workpiece positioning device 28 are controlled by a here not specifically illustrated control logic that may be part of the overall control of the processing center 1, in particular a CNC control of the processing center 1. FIG. 3 shows the vertical position of the workpiece palette 19 that is taken by the palette in the work space 3, as can also be seen in FIG. 1. In FIG. 3, the work space 3, as well as the linear axle arrangements 21 and 22 are omitted for reasons of simplicity and clarity, and in order to not hide essential components of the workpiece positioning device 28 and to illustrate its functionalities. The workpiece positioning device 28 functions as follows:

In order to remove the workpiece palette 19 from the work space 3 the linear axles 23, 24 are moved in such a manner that the gripping surface 33 of each gripping arm 32 reaches under the associate gripping bolt 34 on the workpiece palette 19. Optionally, the gripping device 31 may remain in engagement with the gripping bolt 34 while the workpiece 12 is being processed. When the gripping device 31 is in engagement with the gripping bolt 34, the rear side of the workpiece palette 19 abuts against the stop block 35 that holds the workpiece palette 19 in vertical position and prevents a swaying of said workpiece palette. While the workpiece 12 is being processed, the stop 35 can additionally support the workpiece 12 and hold it still.

Subsequently, the control activates the linear axle arrangements 21, 22 in a suitable manner in order to move the workpiece palette 19 with the workpiece 12 away from the processing unit 7 to the deposit place 17. To do so, only the horizontal linear axle 23 may be moved in order to initially move the workpiece palette 19 away from the work space 3 in horizontal direction, as is shown by FIGS. 4a and 4b. For reference purposes, the vertical starting position is shown in FIG. 4a to 4f.

As soon as the bearing elements 43 of the workpiece palette 19 are located above the pivot bearings 44 the palette can be lowered by means of the linear axle 24 so that the bearing elements 43 are positioned in the pivot bearings 44 and are rotatably positioned and supported therein. This state is illustrated by FIG. 4c.

Subsequently, as indicated by FIG. 4c, the workpiece palette can be pivoted by a quarter circle about the center of the pivot bearing 44 in counterclockwise direction in FIGS. 4a to 4f in order to deposit the workpiece palette 19 on a horizontal deposit surface 18. To do so, the control suitably activates the horizontal linear axle 23 and the vertical linear axle 24 in a combined manner, so that the gripping bolt 34 accommodated in the gripping surface 33 of the gripping arm 32 is moved on the circular path or the circular arc 52 shown by FIG. 4c. To do so, the control substantially activates the horizontal linear axle 23 in such a manner that it follows a sine function over the course of time when the origin of the horizontal path is assumed to be in the center of the pivot bearing and the maximum horizontal path of movement corresponds to that point at which the circular arc 52 intersects the horizontal deposit surface 18. At the same time, the vertical linear axle 24 is activated in such a manner that it follows a cosine function over the course of time, wherein—in this case—the origin of the vertical movement is again assumed to coincide with the center of the pivot bearing 44, while the maximum vertical path of movement corresponds to the point at which the circular arc 52 intersects a vertical straight line leading through the center of the pivot bearing 44 to the deposit surface 18.

The combination of such a movement of the horizontal and the vertical linear axles 23, 24 results in the increasing pivoting of the workpiece palette 19 from the vertical position in FIG. 4c in the direction of a horizontal position as illustrated by FIGS. 4d and 4e. In doing so, the pivot bearing 44 ensures a full-surface, flush pivot support and a partial support of the workpiece palette 19 with the tool 12, as a result of which the load on the linear axles 23, 24 is decreased. The first finger 47 of the claw 46 is appropriately configured in such a manner that, with it, the workpiece palette 19 can be moved up and into the horizontal end position shown in FIG. 4f, in which end position said workpiece palette lies on the horizontal deposit surface 18 of the deposit place 17. The rotatable receptacle of the gripping bolts 34 in the gripping arms 32 supports the pivoting of the workpiece palette 19.

Advantageously, in this case only the horizontal linear axle 23 and the vertical linear axle 24 of the first and the second linear axle arrangement 21, 22 are used as a pivoting device 53 for pivoting the workpiece palette 19. Complex and structurally large pivoting devices or expensive pneumatic or hydraulic piston-cylinder units that are conventionally used for pivoting the workpiece palette 19 are not required here. Rather, the linear axles 23, 24, otherwise also required for transporting the workpiece palette 19, are sufficient. The linear axles 23, 24 are also designed to be sufficiently robust and strong in order to be able to effortlessly bear loads due to the workpiece palette 19 and the tool 12. The linear axles 23, 24 can also be moved with extremely high precision in order to effect a precise pivoting movement of the workpiece palette 19.

If desired, the linear axles 23, 24 can be appropriately moved out of the state shown in FIG. 4f in order to bring the gripping device 31 out of engagement with the gripping bolts 34 of the workpiece palette 19 and release the workpiece palette.

If, conversely, a workpiece palette 19 is to be moved starting from the deposit place 17 and the state shown in FIG. 4f into the processing position illustrated in FIG. 3, the horizontal and the vertical linear axles 23, 24 of the first and the second linear axle arrangements 21, 22 are activated in the opposite direction in order to grip the gripping bolt 34 of the workpiece palette 19, to subsequently move—by combined movement of the two linear axles 23, 24—the workpiece palette clockwise on a quarter circle from the horizontal position into the vertical position shown by FIGS. 4a to 4f; and to then lift the workpiece palette 19 into the vertical position shown by FIG. 4c in order to bring the bearing elements 43 out of engagement with the pivot bearings 44, and to finally move the appropriately lifted workpiece palette 19 into the final vertical processing position according to FIG. 3 by moving the horizontal linear axle 23.

Advantageously, the linear movements of the linear axles 23, 24 required for this can be performed rapidly and without great effort with the use of a CNC control of the processing center 1. The pivoting on the circular path 52 effected by the pivoting device 53 with the linear axles 23, 24 can be derived from a functionality already existing in the CNC control, said functionality being disposed to guide a tool on a circular arc while being processed. Advantageously, this functionality can be utilized by the pivoting device 53.

FIGS. 5 and 6a to 6g show detailed side views of the processing center 1 shown by FIG. 1, with a modified embodiment of the workpiece positioning device 28. In so far as the structure and function of parts correspond to those of the embodiment according to FIGS. 1 to 4, reference is made to the description hereinabove, using the same reference signs.

FIG. 5 illustrates a possible embodiment of the horizontal linear axle 23 and the vertical linear axle 24 in greater detail. Here, the horizontal axle 23 has a horizontal cantilever 54 on which is arranged a not specifically illustrated motor that drives a horizontal slide 57 in horizontal direction via a chain 56. Mounted on the horizontal slide 57 is a vertical cantilever 58 that supports a motor 59 that drives a vertical slide 62 in vertical direction via a chain gear 61. Other than that, the control and movement of the linear axles 23, 24 take place in the manner described hereinabove.

As is further obvious from FIG. 5, the processing center 1 here comprises the setup station 13, as well as the buffer station 14. Each station 13, 14 comprises a deposit place 17 that is configured substantially the same in the form of a deposit table. The deposit place 17 is part of the workpiece positioning device 28 for the workpiece palette 19.

The embodiment according to FIGS. 5 and 6 is different from that according to FIGS. 1 to 4, in particular as concerns the rotating support of the workpiece palette 19 on the deposit place 17. Here, instead of the claws 46 provided on the horizontal deposit surface 18, there are provided claws 62, each being arranged on a narrow side 63 of the deposit place 17 associated with the narrow side 36 or 37 of the workpiece palette 19. Preferably, the claws 62 can be integrally cast in one piece to the narrow sides 36 or 37 or be mounted thereto in another manner. Again, the claw 62 has two claw fingers 63, 64 that, between them, define—in this case—a substantially V-shaped, slightly rounded pivot bearing surface 66.

The pivot bearing surfaces 66 accommodate bearing elements 43 that, here, are configured as substantially cylindrical bearing pins 67 that are arranged in a projecting manner on the narrow sides 36, 37. The bearing pins 67 are positioned in the vicinity of the corners connecting the narrow sides 36 and 37 with the first longitudinal side 38.

Advantageously, considering this embodiment of the pivot bearing, the horizontal deposit surface 18 of the deposit place 17 may be completely planar and without obstacles, and it can be produced relatively easily. It is understood that, here, the pivot bearing according to FIGS.

2 to 4 can be used instead of the one shown by FIG. 5. Furthermore, it is understood that the pivot bearing surfaces 49, 66 may be selectively rounded, V-shaped or configured in any other suitable way in order to fulfill the desired function of a pivot bearing.

Figure 6A:
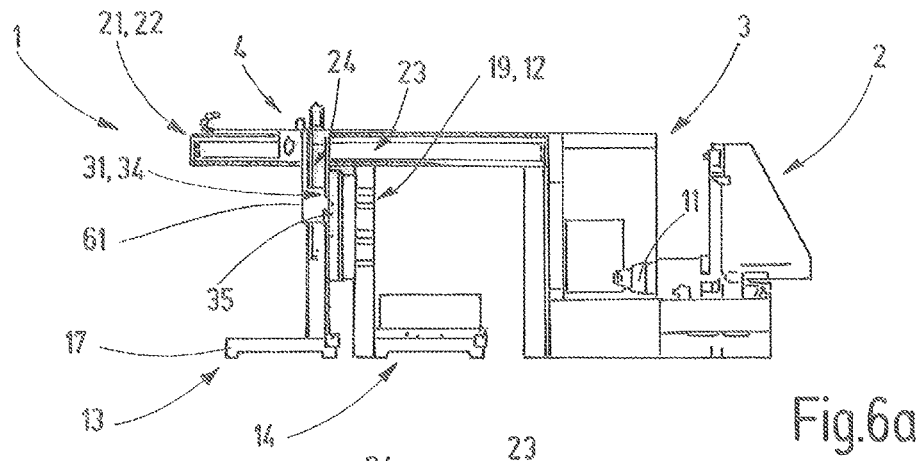
FIGS. 6a to 6g a simplified detail of a representation of the horizontal processing center according to FIG. 5, illustrating the process of positioning workpiece pallets before and after processing.
Figure 6B:
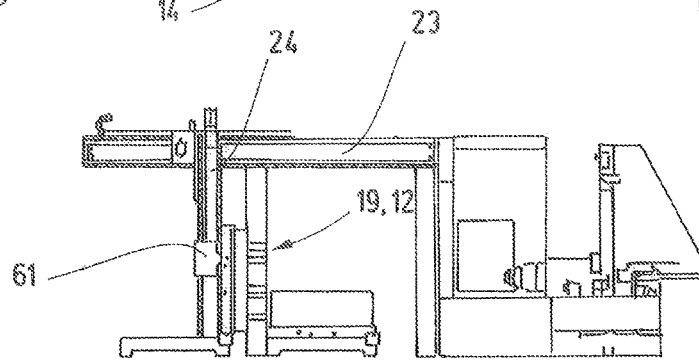

FIG. 5 shows the vertical position in which a workpiece palette 19 with the tool 12 mounted thereto is held in the work space 3 in order to be processed by the processing spindle 11 of the processing unit 7. FIGS. 6a to 6g show, in simplified representations, the chronological sequence of positioning workpiece palettes 19 in a processing center 1 that comprises a setup station 13, as well as a buffer station 14, in order to keep the processing times minimal. After processing, the workpiece palette 19 is moved back to the setup station 13 by moving the horizontal linear axle 23 in order to be deposited on its deposit place 17. To do so, the workpiece palette 19 is lowered from the elevated position in FIG. 6a until the bearing elements 43—here, in particular the bearing pins 67—engage in the associated pivot bearing 44—here, in particular, the claws 62. This state is shown by FIG. 6b.

Figure 6C:
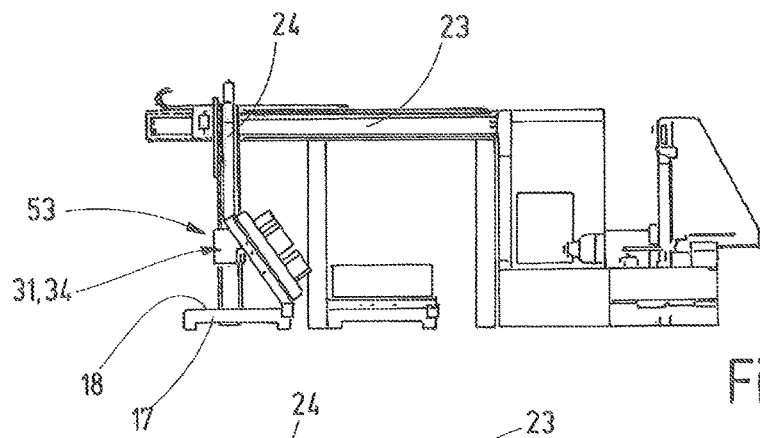
Figure 6D:
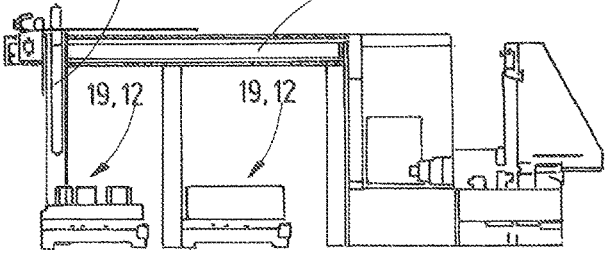
Figure 6E:
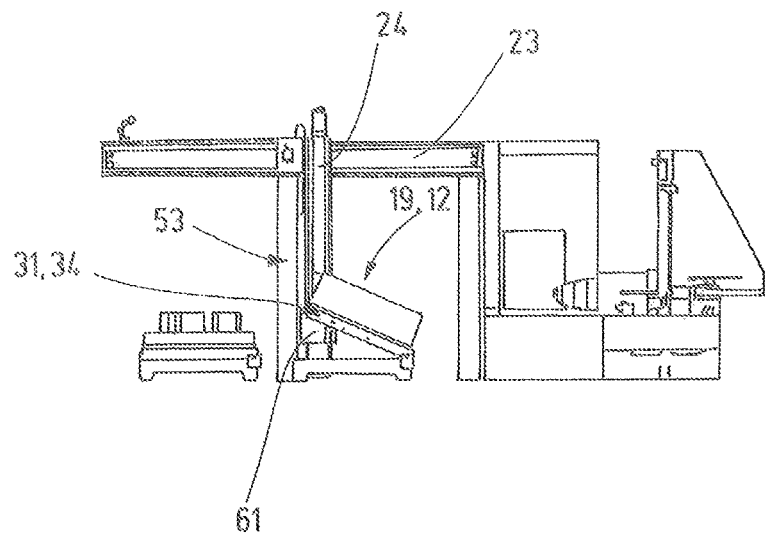

Thereafter, by simultaneously moving the horizontal linear axle 23 and the vertical linear axle 24 of both linear axle arrangements 21 and 22, the workpiece palettes 19 with the workpiece 12 in FIG. 6c, is pivoted counterclockwise in order to be deposited on the horizontal deposit surface 18 of the deposit place 17, as illustrated by FIG. 6d.

Thereafter, the linear axle system 16 is moved to the buffer station 14 in order to grip, with the gripping device 31, a further workpiece palette 19 located there and to pivot said workpiece palette out of the horizontal position shown in FIG. 6d (cf. FIG. 6e) in clockwise direction in order to transfer it in its vertical position. This takes place by a combined movement of the horizontal and the vertical linear axles 23, 24.

Figure 6F:
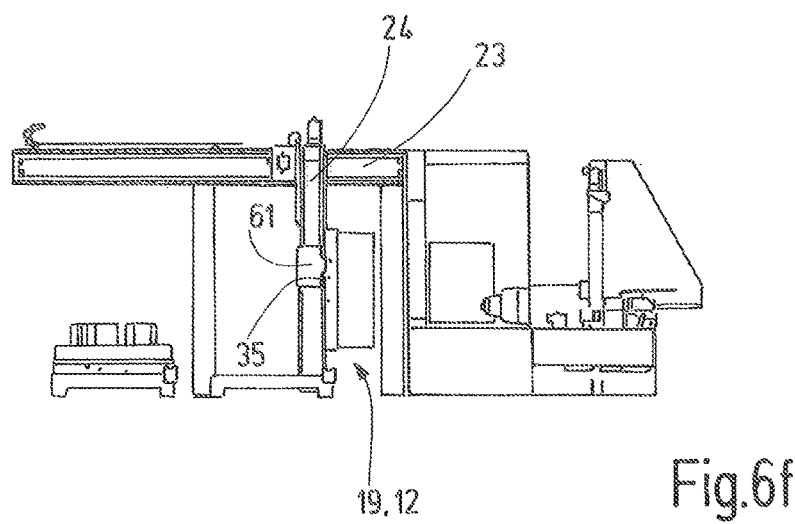
Figure 6G:
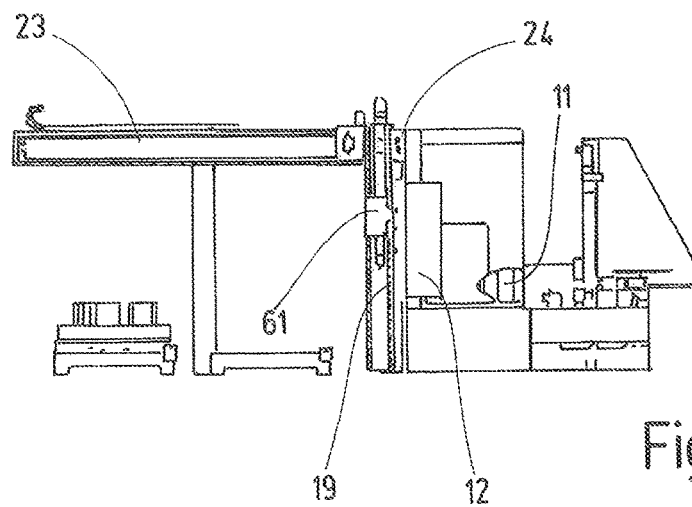

Subsequently, the further workpiece palette 19 with the tool 12 can be lifted in order to bring the bearing pins 67 out of engagement with the claws 62 and transport the further workpiece palette 19 in the desired height position as shown by FIG. 6f. Finally, the further workpiece palette 19 is delivered in horizontal direction and brought into the processing position shown in FIG. 6g.

Advantageously, when processing one workpiece palette 19, it is possible, at the same time, to set up another workpiece palette 19 on the setup station 13 and to temporarily store it on the buffer station in order to be available for the next processing operation. As a result of this, the processing times can be clearly reduced.

Figure 7:
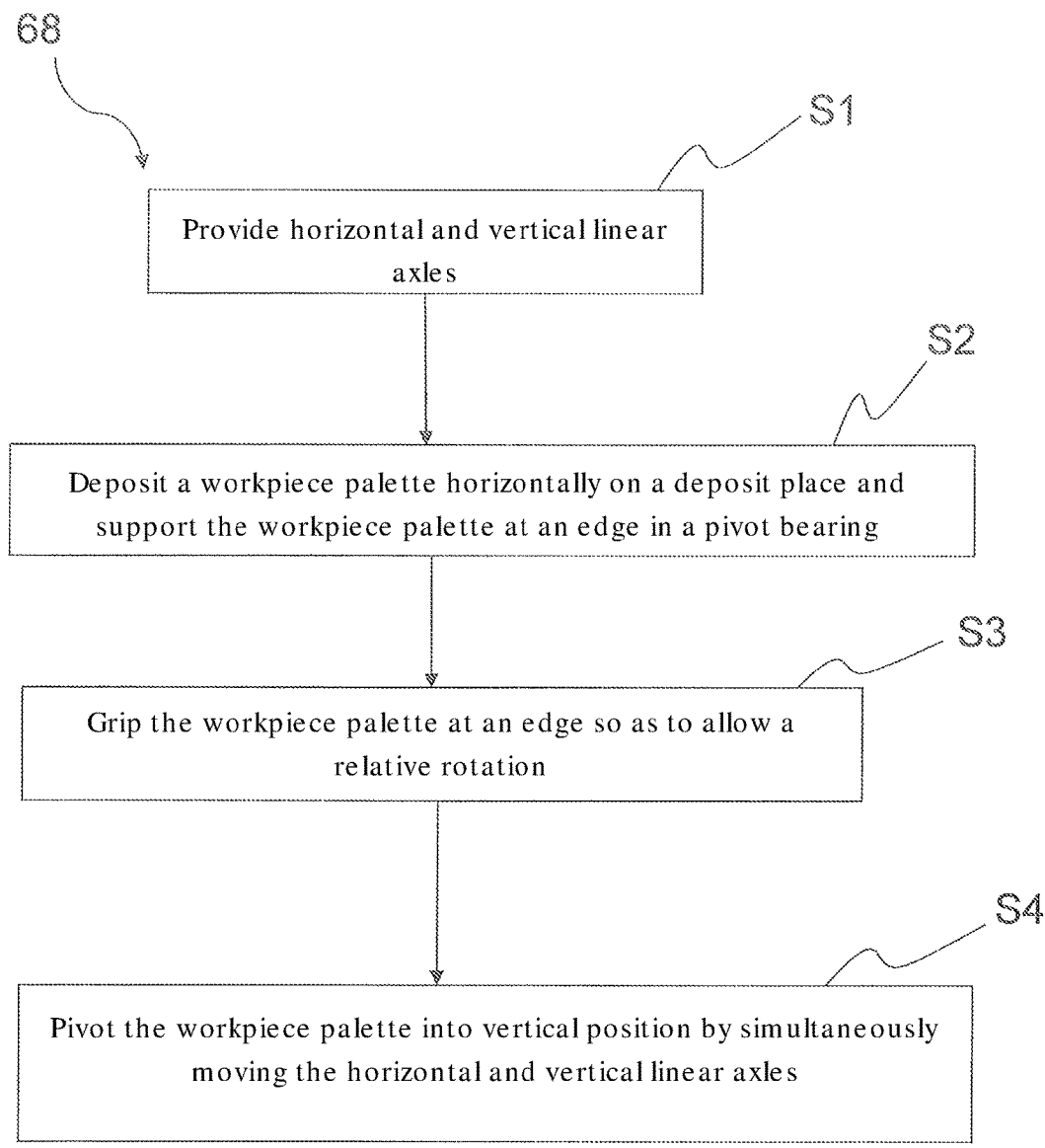
FIG. 7 a greatly simplified form of a flow chart of a method for positioning a workpiece mounted on a workpiece palette in a processing center according to one embodiment of the invention.

FIG. 7 shows a simplified flow chart of a method for positioning a workpiece mounted on a workpiece palette in a processing center, for example a workpiece 12 mounted on a workpiece palette 19 in the processing center 1, as illustrated by FIGS. 1 to 4 and 5 to 6, respectively. The method 68 is performed as follows:

In step S1 a horizontal and a vertical linear axle such as, for example, the linear axles 23 and 24 according to FIGS. 1 to 6, are provided for transporting a workpiece palette 19 in vertical and horizontal directions. The linear axles may be part of a general transport arrangement that conveys the workpiece palettes 19 into the processing center 1, within said processing center and out of said processing center.

In step S2 a workpiece palette 19 is deposited in horizontal position on a deposit place such as, for example, the deposit place 17 of a setup station 13 or a buffer station 14, as illustrated by FIGS. 1 and 5, in which case a first edge of the workpiece palette is rotatably received in a pivot bearing such as, for example the pivot bearing 44 in FIGS. 1 and 5, in such a manner that the workpiece palette 19 can be pivoted or rotated about this pivot bearing 44.

In step S3 the workpiece palette located in horizontal position on the deposit place 17 is gripped with a gripping device, for example, the gripping device 31 according to FIGS. 1 to 6, by a second edge of the workpiece palette 13 in a manner so as to allow a relative rotation, so that a gripping element, for example the gripping bolt 34 of the workpiece palette 19, is securely received, for example in a gripping arm, while still allowing a relative rotation between these.

In step S4 the horizontal and the vertical linear axles, e.g., 23, 24, are moved in a combined coordinated manner such that the second edge of the workpiece palette 19 is pivoted on a circular path 52 about the pivot bearing 44 in order to transfer the workpiece palette 19 from a horizontal position into a vertical position such as can be seen, for example, from FIGS. 2, 4c and 6b.

With the use of the method according to the invention it is possible to pivot—back and forth—a workpiece palette 19 with workpieces 12 mounted thereon, in a simple manner with simple already existing means, between a horizontal position and a vertical position, without requiring a specific workpiece rotating or pivoting device.

The method may comprise further steps of the method of moving the vertical and/or horizontal linear axles 23, 24 in a sequential or combined manner in order to further lift the workpiece palette 19 with the workpiece and to transport it in horizontal direction to another processing station 2 in order to position said workpiece palette in a vertical processing position.

Furthermore, the method may comprise the reverse steps of removing the workpiece palette 19 with the workpiece 12 out of the processing station 2 by moving the horizontal and the vertical linear axles 23, 24, by lowering the workpiece palette 19 in order to rotatably position a bearing element 43 provided on its first edge in a pivot bearing 44 on a deposit place 17 of the setup station 13 or the buffer station 14, for example, and by pivoting the workpiece palette 19 around the pivot bearing 44 by the combined movement of the horizontal and the vertical linear axles 23, 24 in such a manner that the second edge of the workpiece palette 19 is lowered following a circular arc 52 until the workpiece palette 19 lies flat on the deposit place 17 in horizontal position.

Numerous modifications are possible within the framework of the invention. As already mentioned, for example different forms of the gripping device 31 and the gripping element 34 are possible in order to be able to grip a workpiece palette 19 in the manner of a relative rotation. Likewise, the bearing elements 43 and the pivot bearing 44 may take different forms, as long as they allow a pivoting support of a workpiece palette 19 on one of its edges. As illustrated by the Figures, the linear axles 23, 24, can be driven with a gear, for example the chain gear 59 as shown by the Figures, or be operated without gearing and, be driven, for example by electric drives. The workpiece positioning device 28 according to the invention is suitable for different processing machines of different dimensions and for different applications, as well as for processing centers that may comprise one or more processing stations which are sequentially supplied with a workpiece 12. To this extent, the workpiece positioning device 28 can also be a part of a general transport device that transports workpiece palettes 19 into the processing center 1, within the processing center 1, and out of the processing center 1. Advantageously, the workpiece palettes 19—with or without workpieces 12—can also be temporarily stored in vertical position in appropriate storage locations and, from there, be transported into the vertical position, whereby the pivoting device 53 of the workpiece positioning device 28 makes it possible in a simple manner to move the workpiece palettes 19 from a vertical position into a horizontal position and vice versa.

Disclosed herein are a workpiece positioning device 28 for a processing center 1, a processing center 1 and a method for positioning a workpiece 12 mounted on a workpiece palette 19 in a processing center 1. The workpiece positioning device 28 comprises a deposit place 17 that comprises a horizontal deposit surface 18 for a workpiece palette 19 with a workpiece 12 mounted thereon and a pivot bearing that receives the workpiece palette 19 on a first edge 41 of said workpiece palette in a rotatable manner. Furthermore, the workpiece positioning device 28 comprises a pivoting device 53 for transferring the workpiece palette 19 from a horizontal position into a vertical position, and vice versa. The pivoting device 53 comprises a horizontal and a vertical linear axle 23, 24 and a gripping device 31 and is disposed to grip a workpiece palette 19 on another, second edge 42 and to pivot, by simultaneously moving the horizontal and the vertical linear axles 23, 24, the workpiece palette 19 around the pivot bearing 44 on a circular path 52. The pivoting motion is effected only by the motor-driven linear axles 23, 24 that are also provided for the transport of the workpiece palettes 19.

What is claimed is:

1. A workpiece positioning device for a processing center (1), in particular a horizontal processing center, wherein workpieces (12) mounted on a workpiece palette are processed in the processing center (1), with a deposit place (17) that comprises a horizontal deposit surface (18) for a workpiece palette (19), and a pivot bearing (44) that is disposed to take up the workpiece palette (19) on a first edge (41) thereof in a rotatable manner, and with a pivoting device (53) for transferring a workpiece palette (19) from a horizontal position into a vertical position and vice versa, wherein the pivoting device (53) is disposed to grip a workpiece palette (19) on another, second edge (42) and, by simultaneously moving a horizontal and a vertical linear axle (23, 24), to pivot the second edge (42) of the workpiece palette (19) on a circular path (52) around the pivot bearing (44) in order to deposit the workpiece palette (19) in its horizontal position on the deposit place (17) or move it into a vertical position, and wherein the workpiece positioning device (28) is configured to lift the workpiece palette (19) in vertical direction out of the pivot bearing (44) of the deposit place (17) and lower the workpiece palette (19) in vertical direction onto the pivot bearing (44) of the deposit place (17), respectively, using the vertical linear axle (24) while the workpiece palette (19) is in the vertical position and to transport the workpiece palette (19) in horizontal direction using the horizontal linear axle (23) while the workpiece palette (19) is in the vertical position.

2. The workpiece positioning device according to claim 1, wherein the pivoting device (53) is disposed to pivot the workpiece palette (19) on a quarter circle by 90° around the pivot bearing (44) in each direction of rotation.

3. The workpiece positioning device according to claim 1, wherein the horizontal linear axle (23) comprises a motor-driven horizontal slide (26; 57), said slide being disposed for delivering the workpiece palette (19) to a processing station (2) of the processing center (1) and for removing it therefrom, respectively, and wherein the vertical linear axle (24) comprises a motor-driven vertical slide (27; 61), said slide being disposed for raising or lowering a workpiece palette (19) in vertical direction.

4. The workpiece positioning device according to claim 1, wherein the movement of the linear axles (23, 24) is controlled by a control, in particular a CNC control, of the processing center (1).

5. The workpiece positioning device according to claim 4, wherein the horizontal linear axle (23) and the vertical linear axle (24) are activated in such a manner that the path of movement of the vertical linear axle (24) follows a cosine function in the course of time wherein the origin of the vertical movement coincides to a center of the pivot bearing (44), while the maximum path of the vertical movement corresponds to a point at which the circular path (52) intersects a vertical straight line leading though the center of the pivot bearing (44) to the deposit surface (18), while the path of movement of the the horizontal linear axle (23) follows a sine function in the course of time wherein the origin of the horizontal path corresponds to a point at the center of the pivot bearing (44) and the maximum horizontal path of horizontal movement corresponds to a point at which the circular path (52) intersects the horizontal deposit surface (18).

6. The workpiece positioning device according to claim 1, wherein the pivot bearing (44) comprises a claw (46; 62) that is arranged on the horizontal deposit surface (18) or on one side of the deposit place (17) and defines a circular or V-shaped pivot bearing surface (49; 66).

7. The workpiece positioning device according to claim 6, wherein the claw (46) has a first and a second claw finger (47, 48), said fingers projecting from the horizontal deposit surface (18) and defining between each other the pivot bearing surface (49), wherein the second claw finger (48) located closer to the edge (51) of the deposit place (17) projects farther from the horizontal deposit surface (18) than the first claw finger (47) located more remote from the edge (51) of the deposit place (17).

8. The workpiece positioning device according to claim 1, said device further comprising a bearing element (43) provided on the workpiece palette (19), said bearing element being configured to be rotatably accommodated with minimal play in the pivot bearing (44).

9. The workpiece positioning device according to claim 8, wherein the bearing element (43) is a partially cylindrical region (45) that is provided on a side (38) of a workpiece palette (19) adjoining the first edge (41), or is a cylindrical bearing pin (67) projecting from a lateral surface (36, 37) of a workpiece palette (19), wherein the outside diameter of the partially cylindrical region (45) or of the bearing pin (67) matches the inside dimensions of a pivot bearing surface (49, 66) of the pivot bearing (44).

10. The workpiece positioning device according to claim 8, further including two or more bearing elements (43) are provided at a distance from each other on the first edge (41) of the workpiece palette (19), and a corresponding number of pivot bearings (44) at a distance from each other are provided on an edge (51) of the deposit place (17) associated with the first edge (41) of the workpiece palette (19).

11. The workpiece positioning device according to claim 1, wherein the workpiece palette (19) bears at least one gripping element (34) and the pivoting device (53) comprises a gripping device (31) that is disposed to grip one of the at least one gripping element (34) in a manner allowing a relative rotation.

12. The workpiece positioning device according to claim 11, wherein the at least one gripping element (34) is a gripping bolt provided on the workpiece palette (19), said gripping bolt projecting in the vicinity of the second edge (42) of the workpiece palette (19) on a lateral surface (36, 37) of the workpiece palette (19) and having a substantially cylindrical outside surface for gripping by the gripping device (31).

13. The workpiece positioning device according to claim 11, wherein the gripping device (31) comprises a gripping arm (32) that is arranged on a slide (26, 27; 57, 61) of one of the horizontal and vertical linear axles (23, 24) and has a gripping surface (33), rounded at least in a portion thereof, for rotatably receiving the gripping element (34) of the workpiece palette (19) with minimal play.

14. The workpiece positioning device according to claim 13, wherein the gripping device (31) further comprises a stop block (35) that is provided and arranged on the slide (26, 27; 57, 61) so as to come into abutment with the workpiece palette (13) when said workpiece palette is pivoted into a vertical position.

15. A processing center for processing workpieces that are mounted on a workpiece palette (19), comprising
   a processing station (2) that comprises a processing spindle (11) that is supported and guided so as to be movable on a machine bed (6);
   a setup station (13) for mounting workpieces (12) on a workpiece palette (19) and/or a buffer station (14) for the temporary intermediate storage of a workpiece palette (19) with the workpiece (12) mounted thereon, and
   a workpiece positioning device (28) according to claim 1 that is disposed to transfer a workpiece palette (19) with the workpiece (12) from a horizontal position into a vertical position and vice versa, during a transport between one of the setup station (13), the buffer station (14) and the processing station (2) and another one of the stations (13, 14, 2).

16. The processing center according to claim 15, said processing center being a horizontal processing center, wherein the processing spindle (11) is held in a substantially horizontal position on a machine frame (9), and wherein workpieces (12) are loaded on the workpiece palette (19) in horizontal position and processed in vertical position.

17. The processing center according to claim 15, said processing center comprising a setup station (13) with a deposit place (17), as well as a buffer station (14) with a deposit place (17), wherein the workpiece positioning device (28) is disposed to deposit workpiece palettes (19) in horizontal position on the deposit places (17) of the setup station (13) and the buffer station (14) and to transport said workpiece palettes in vertical position between the setup station (13), the buffer station (14) and the processing station (2).

18. A method for positioning a workpiece (12) mounted on a workpiece palette (19) in a processing center (1), said method comprising the steps of
   providing a horizontal and a vertical linear axle (23, 24) for transporting a workpiece palette (19) in vertical and horizontal directions in a first step (S1),
   depositing the workpiece palette (19) in horizontal position on a deposit place (17) so that a first edge (41) of the workpiece palette (19) is rotatably received in a pivot bearing (44) in a second step (S2),
   gripping the workpiece palette (19) on another, second edge (42) in the manner of a relative rotation in a third step (S3),
   simultaneously moving of the horizontal and the vertical linear axles (23, 24) in order to pivot in a fourth step (S4) the workpiece palette (19) on a circular path (52) around the pivot bearing (44) so as to transfer said workpiece palette from a horizontal position into a vertical position, or vice versa,
   lifting the workpiece palette (19) in vertical direction out of the pivot bearing (44) of the deposit place (17) and lowering the workpiece palette (19) in vertical direction onto the pivot bearing (44) of the deposit place (17), respectively, while the workpiece palette (19) is in the vertical position, and
   transporting the workpiece palette (19) in horizontal direction, while the workpiece palette (19) is in the vertical position.

* * * * *